United States Patent
Horisaki et al.

(10) Patent No.: US 7,995,509 B2
(45) Date of Patent: Aug. 9, 2011

(54) WIRELESS COMMUNICATION SYSTEM FOR REDUCING POWER CONSUMPTION WHEN RECEIVING A FRAME HAVING A LOW RECEPTION SUCCESS POSSIBILITY

(75) Inventors: Koji Horisaki, Yokohama (JP); Masahiro Sekiya, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 188 days.

(21) Appl. No.: 12/403,536

(22) Filed: Mar. 13, 2009

(65) Prior Publication Data

US 2009/0245125 A1    Oct. 1, 2009

(30) Foreign Application Priority Data

Mar. 18, 2008  (JP) .................. 2008-070044

(51) Int. Cl.
*G08C 17/00*   (2006.01)
(52) U.S. Cl. ........................ 370/311; 370/252
(58) Field of Classification Search .................. 370/252, 370/253, 254, 310; 455/343.1–343.6
See application file for complete search history.

(56) References Cited

U.S. PATENT DOCUMENTS

| | | | |
|---|---|---|---|
| 6,973,023 B1 * | 12/2005 | Saleh et al. ................... 370/217 |
| 7,356,316 B2 | 4/2008 | Ogiso et al. | |
| 7,515,556 B2 * | 4/2009 | Hui et al. ...................... 370/311 |
| 2005/0201361 A1 | 9/2005 | Morioka et al. | |
| 2006/0098571 A1 * | 5/2006 | Takefman ..................... 370/222 |
| 2009/0034445 A1 * | 2/2009 | Prakash et al. ................ 370/311 |

FOREIGN PATENT DOCUMENTS

| | | |
|---|---|---|
| JP | 2004-297394 | 10/2004 |
| JP | 3641620 | 1/2005 |
| JP | 2005-303585 | 10/2005 |
| JP | 2006-42075 | 2/2006 |
| JP | 2006-303665 | 11/2006 |

OTHER PUBLICATIONS

"IEEE 802.11", The Working Group for WLAN Standards, ANSI/IEEE Std 802.11, 1999 Edition, 2 pages.

\* cited by examiner

*Primary Examiner* — Ricky Ngo
*Assistant Examiner* — Gary Mui
(74) *Attorney, Agent, or Firm* — Oblon, Spivak, McClelland, Maier & Neustadt, L.L.P.

(57) ABSTRACT

A header analysis unit reads a parameter showing a format of a digital signal contained in a received signal. A received signal quality measurement unit measures a quality of the received signal. An awake/sleep control unit controls restart and sleep of a reception unit based on data from the header analysis unit and the received signal quality measurement unit. The awake/sleep control unit stops a reception operation for a period corresponding to a frame length when the quality of the leading portion of the received signal is less than a predetermined threshold.

20 Claims, 4 Drawing Sheets

WIRELESS COMMUNICATION SYSTEM FOR REDUCING POWER CONSUMPTION WHEN RECEIVING A FRAME HAVING A LOW RECEPTION SUCCESS POSSIBILITY

CROSS-REFERENCE TO RELATED APPLICATIONS

This application is based upon and claims the benefit of priority from prior Japanese Patent Application No. 2008-070044, filed Mar. 18, 2008, the entire contents of which are incorporated herein by reference.

BACKGROUND OF THE INVENTION

1. Field of the Invention

The present invention relates to a wireless communication system having a MAC layer and a physical layer. In particular, the present invention relates to a physical layer sleep control method, and for example, is used for an aggregation transmission method of linking a plurality of frames when communication conforming to IEEE 802.11n is performed.

2. Description of the Related Art

Wireless communication is performed according to a frame format prescribed in the standard for each wireless communication and a communication control protocol. According to the foregoing format and protocol, communication is performed between a key station, that is, an access point (AP) and a terminal (branch station), that is, a station (STA) and between wireless communication terminals. In this case, usually, a management frame or frame having an upper layer from a management layer is sequentially transmitted one by one.

For example, in wireless LAN communication, communication is performed between a key station and a terminal and between terminals according to a frame format and a communication control protocol, which are prescribed in Institute of Electrical and Electronics Engineers (IEEE) 802.11. In this case, usually, a management frame having a media access control (MAC) layer or upper layer frame is sequentially transmitted one by one.

However, the conventional case requires the same power consumption as received a frame having a high reception success possibility even if a frame having a low reception success possibility is received.

Jpn. Pat. Appln. KOKAI Publication No. 2006-42075 discloses a multiple input multiple output (MIMO) communication system. In the communication system, a specified reception branch only is operated or waited to operate a necessary and minimum reception branch only.

Jpn. Pat. Appln. KOKAI Publication No. 2005-303585 discloses the following method. According to the method, sleep time is set based on transmission time extracted from a header of a received frame, and reception is stopped while a timer operates.

BRIEF SUMMARY OF THE INVENTION

According to a first aspect of the present invention, there is provided a wireless communication system comprising: a reception unit configured to receive a signal; a header analysis unit configured to receive the received signal to read a parameter showing a format of a digital signal contained in the received signal; a received signal quality measurement unit configured to receive the received signal to measure a quality of the received signal; and an awake/sleep control unit configured to connect to the reception unit, the header analysis unit and the received signal quality measurement unit, and configured to control awake and sleep of at least reception unit, the awake/sleep control unit configured to control to sleep an operation of the at least reception unit for a period corresponding to a frame length extracted from the parameter read by the header analysis unit when the quality measured by the received signal quality measurement unit is lower than a predetermined threshold.

According to a second aspect of the present invention, there is provided a wireless communication system comprising: a reception unit configured to receive a signal; a header analysis unit configured to receive the received signal to read at least one of a frame length, a modulation method and a coding rate from the received signal; a code check unit configured to receive the received signal to check an error detection code contained in the received signal for each frame, and configured to detect a code error; and an awake/sleep control unit configured to connect to the reception unit, the header analysis unit and the code check unit, and configured to control restart and sleep of at least reception unit, the awake/sleep control unit configured to control to sleep an operation of the at least reception unit for a period corresponding to a frame length read by the header analysis unit when the number of code errors detected by the code check unit is more than a predetermined number.

According to a third aspect of the present invention, there is provided a wireless communication system comprising: a reception unit configured to receive a signal; a header analysis unit configured to receive the received signal to read at least one of a frame length, a modulation method and a coding rate from the received signal; a received signal quality measurement unit configured to receive the received signal to measure a quality of the received signal; a code check unit configured to receive the received signal to check an error detection code contained in the received signal for each frame, and configured to detect a code error; and an awake/sleep control unit configured to connect to the reception unit, the header analysis unit and the received signal quality measurement unit, and configured to control restart and sleep of at least reception unit, the awake/sleep control unit configured to control to sleep an operation of the at least reception unit for a period corresponding to a frame length read by the header analysis unit based on the quality measured by the received signal quality measurement unit and the number of code errors detected by the code check unit.

DETAILED DESCRIPTION OF THE INVENTION

Figure 1A:
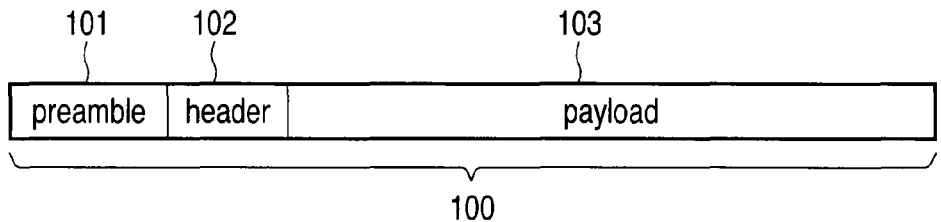
FIG. 1A is a view showing a configuration example of a frame exchanged in a wireless communication system according to a first embodiment of the present invention.

Various embodiments of the present invention will be hereinafter described with reference to the accompanying drawings. In the following description, the same reference numerals are used to designate portions common to all drawings. The following embodiments are applicable to any of the following wireless communication systems. One is a wireless communication system composed of a key station and a branch station. The other is a wireless communication system composed of wireless communication terminals, which are not distinguished as a key station or a branch station.

First Embodiment

The first embodiment relates to a wireless communication system, which can receive and transmit a frame conforming to the IEEE 802.11 standard.

Figure 1B:
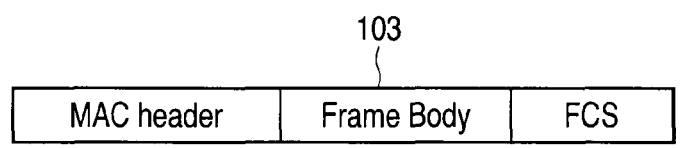
FIG. 1B is a view showing one example of payload shown in FIG. 1A, that is, a MAC frame format.

FIGS. 1A and 1B show the frame configuration of a digital signal received by the wireless communication system of this embodiment. The frame configuration conforms to the IEEE 802.11 standard. As shown in FIG. 1A, a decoded frame 100 is composed of a preamble 101, a header 102 and a payload 103.

The preamble 101 is a signal determined in accordance with a wireless standard. For example, the preamble 101 is used for performing the following functions. One is detection at the side receiving a transmission frame. Another is reception gain control. Another is time synchronization, and another is frequency synchronization. The header 102 is a signal recording a parameter showing a format of the frame 100. For example, an entire frame length of the frame 100, a modulation method and a coding rate of the following payload 103 are given as the parameter. The payload 103 is a portion excluding the preamble 101 and the header 102, and so-called received data.

FIG. 1B shows one example of a MAC frame format as the payload 103 shown in FIG. 1A. The MAC frame has a MAC header, a frame body and a check sequence (frame check sequence [FCS]). Specifically, the MAC header sets data required for reception processing of a MAC layer. The frame body sets data (data from upper layer) in accordance with the kind of frame. The check sequence sets an error detection code used for determining whether or not the MAC header and the frame body have been received normally, for example, a cyclic redundancy check (CRC) code.

Figure 2:
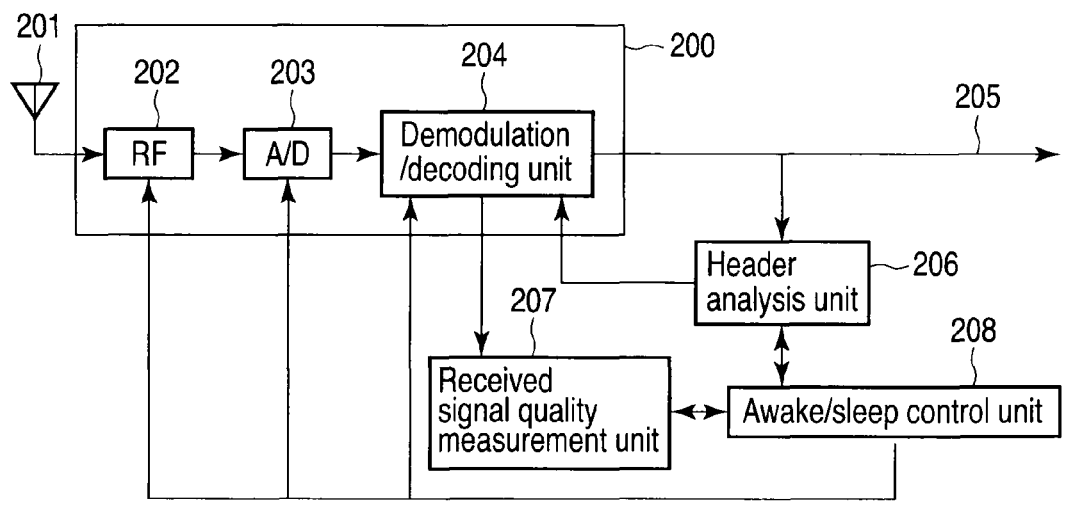
FIG. 2 is a block diagram showing the configuration of hardware of the wireless communication system according to the first embodiment.

FIG. 2 shows the configuration of hardware, in particular, a physical layer of a wireless communication system according to a first embodiment of the present invention. The wireless communication system of this embodiment has a radio-frequency (RF) unit 202, an analog-to-digital (A/D) converter unit 203. Further, the system has a demodulation/decoding unit 204, a header analysis unit 206, a received signal quality measurement unit 207 and an awake/sleep control unit 208. The foregoing RF unit 202, A/D converter unit 203 and demodulation/decoding unit 204 configure a reception unit 200. The reception unit 200 demodulates and decodes a signal received by an antenna 201.

The signal received by the antenna 201 is converted to a proper frequency band by the RF unit 202. Thereafter, the received signal is converted to a received digital signal by the A/D converter unit 203, and then, input to the demodulation/decoding unit 204. The received digital signal is demodulated and decoded by the demodulation/decoding unit 204, and output as the decoding result 205. It should be noted that the frame configuration of the received digital signal is as described in FIGS. 1A and 1B.

The header analysis unit 206 reads a parameter of a format of the received digital signal from the header 102 of the frame 100 shown in FIG. 1A. As described in FIG. 1A, for example, an entire frame length of the frame 100, a modulation method and a coding rate of the payload 103 are given as the parameter. The parameter is notified to the demodulation/decoding unit 204 to be used for demodulating/decoding the decoding result 205.

The received signal quality measurement unit 207 measures a quality of the leading portion of the received digital signal, and then, notifies the measured result to the awake/sleep control unit 208. The leading portion is the leading portion of the preamble 101, header 102 or payload 103. For example, received signal strength, response estimation result of transmission channel or error vector magnitude (EVM) is used as the index of the received signal quality.

The awake/sleep control unit 208 is a control unit for determining continuation/sleep of the receiving operation of the wireless communication system shown in FIG. 2. In order to determine continuation/sleep of the receiving operation, the unit 208 holds a received signal quality threshold. The received signal quality is the same the index of the quality measured by the received signal quality measurement unit 207. The foregoing received signal quality threshold is a fixed value optionally determined for each index of the received signal quality, and shows a degree of received signal quality. The threshold has no need to be determined to one way, for example, it may be determined in accordance with a modulation method and a coding rate of the payload 103. To give one example, received signal strength is determined as the received signal quality index. If the modulation method is 16 QAM and the coding rate is 1/2, the threshold is set to −80 dBm. Moreover, if the modulation method is 64 QAM and the coding rate is 3/4, the threshold is set to −70 dBm.

One control operation of the awake/sleep control unit 208 will be described below. The unit 208 determines continuation/sleep of the reception operation based on the foregoing received signal quality. In this case, the unit 208 previously holds each received signal quality threshold for determining the continuation/sleep of the reception operation. The received signal strength is used as the received signal quality index, and a continuation threshold of the reception operation is determined as −65 dBm while a sleep threshold thereof is determined as −75 dBm.

If the foregoing received signal quality is less than the received signal quality threshold, that is, if FCS of a logical frame of the leading portion of the payload 103 is an error, it is determined that the reception operation sleeps. Based on the foregoing judgment, the following control is carried out with respect to at least reception unit 200 operating in reception. Namely, a signal instructing operation be stopped is output for a period of a frame length read by the header analysis unit 206 to start the sleep of the reception operation. On the other hand, sleep control of a physical layer is carried out for a remaining period of the logical frame. According to this embodiment, each operation of the header analysis unit 206 and the received signal quality measurement unit 207 is slept in addition to the FR unit 202, A/D converter unit 203 and demodulation/decoding unit 204 included in the reception unit 200. The awake/sleep control unit 208 manages the frame length, and then, restarts all operation after the operation is stopped over the period of the frame length.

According to the first embodiment, if the system receives a frame having a low reception success probability, the reception operation is stopped soon. This serves to reduce power consumption. As described above, the period of the frame length read by the header analysis unit 206 elapsed, and thereafter, the reception operation is restarted. Therefore, the operation is slept with respect to a limited frame having a low reception success probability. This serves to reduce an influence given to reception of other frame.

This embodiment is applied to the wireless communication system, which can receive and transmit a frame conforming to the IEEE 802.11 standard. In this case, this embodiment is applicable to a wireless communication system conforming to another wireless communication standard.

According to this embodiment, if an FCS error occurs, the awake/sleep control unit 208 stops the reception operation for a period of the frame length of the frame 100. Other configuration may be applied in addition to the above configuration. For example, the reception operation may be slept for a period excluding a frame length when FCS error occurs in preamble 101, header 102 and payload 103 from a period of the frame length of the frame 100.

Second Embodiment

Figure 3A:
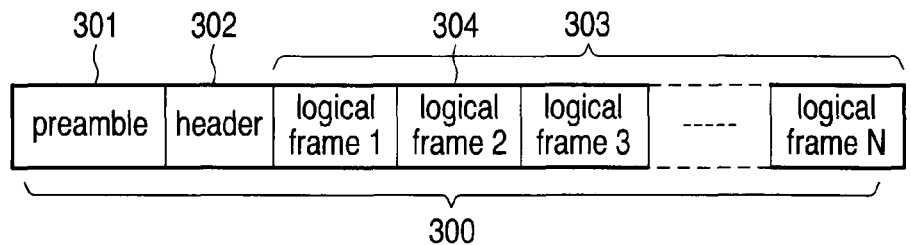
FIG. 3A is a view showing a configuration example of a frame exchanged in a wireless communication system according to a second embodiment of the present invention.

FIG. 3A shows the configuration of a frame, which is received and transmitted in a wireless communication system according to a second embodiment of the present invention. A frame 300 is composed of a preamble 301, a header 302 and a payload 303. The preamble 301 and the header 302 are the same as the preamble 101 and the header 102 described in FIG. 1B. The payload 303 is composed of at least one logical frame 304.

Figure 3B:
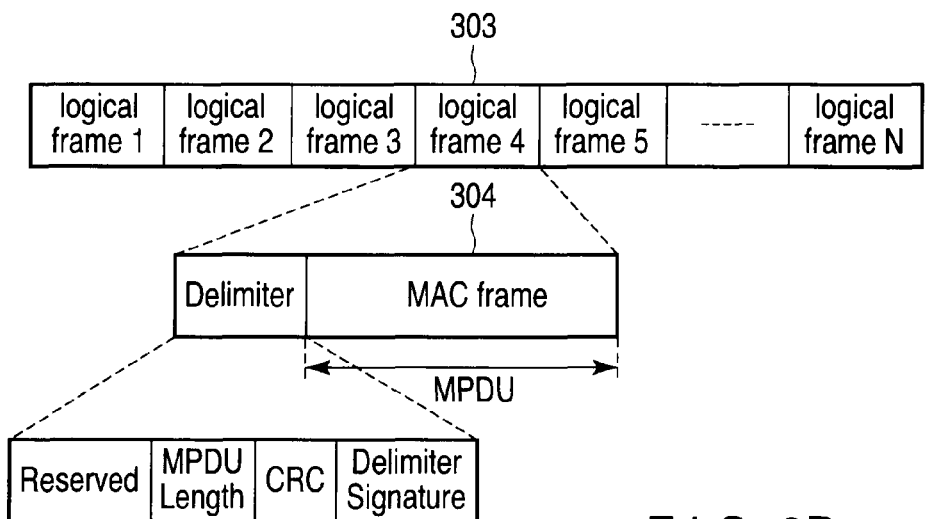
FIG. 3B is a view showing one example of payload shown in FIG. 3A, that is, aggregation frame format.

FIG. 3B shows one example of the payload 303 shown in FIG. 3A. Specifically, FIG. 3B shows a normal format of an aggregation frame in a transmission method (aggregation) conforming to IEEE 802.11n receiving and transmitting a plurality of linked logical frames 304. The logical frame 304 includes an MPDU MAC frame added with Delimiter at the leading portion. The Delimiter has data, that is, reserved, MPDU length, CRC and Delimiter Signature. It is determined by a PHT header (physical layer header) whether the frame is an aggregation frame or a normal frame (non-aggregation frame).

Figure 3C:
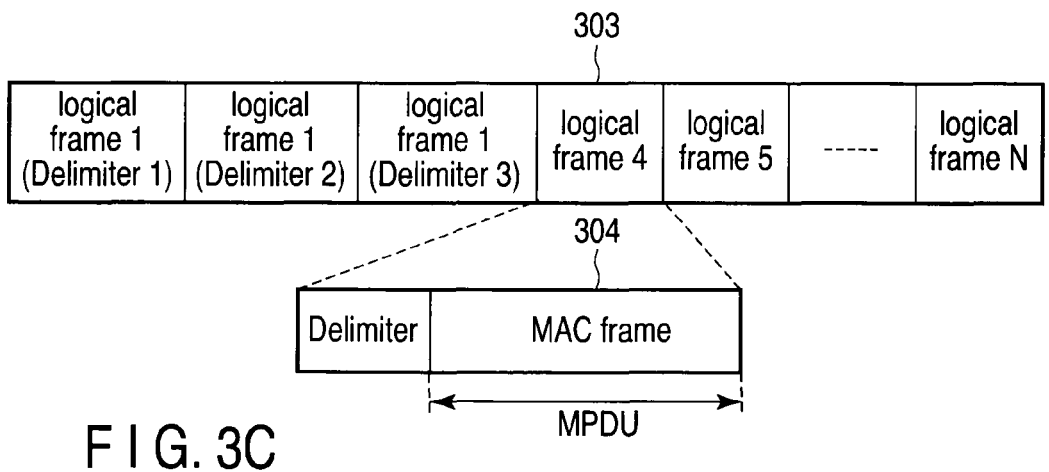
FIG. 3C is a view showing one example of payload shown in FIG. 3A, that is, another aggregation frame format.

FIG. 3C shows another example of the payload 303 shown in FIG. 3A. Specifically, FIG. 3C shows a format when Delimiter of length zero exists at the leading portion or on the way of the linked logical frames in an aggregation frame.

Figure 4:
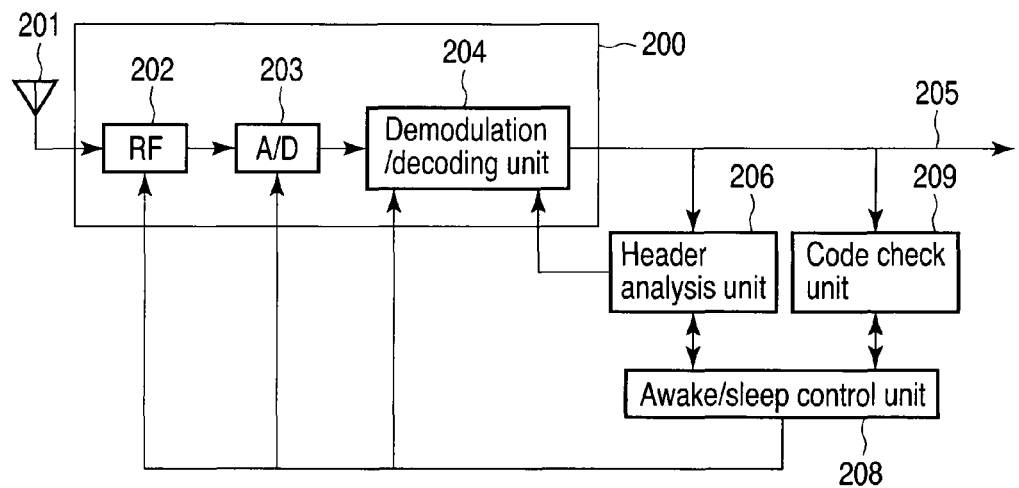
FIG. 4 is a block diagram showing the configuration of hardware of the wireless communication system according to the second embodiment.

FIG. 4 shows the configuration of hardware, in particular, a physical layer of a wireless communication system according to the second embodiment. The wireless communication system of this second embodiment differs from that of the first embodiment in the following point. Namely, the received signal quality measurement unit 207 is omitted, and a code check unit 209 is additionally provided.

The code check unit 209 checks an error detection code for each logical frame. If a logical frame including an error exists, the unit 209 makes a request to retransmit the frame to a communicating station. A CRC code has been well known as the error detection code. As shown in FIG. 3A, the payload 303 is composed of a plurality of logical frames having an error check code. In this way, if an error occurs, the logical frame having the error is only retransmitted. Therefore, excellent transmission efficiency is provided.

In the wireless communication system of this embodiment, the code error detected by the code check unit 209 is supplied to the awake/sleep control unit 208. The unit 208 determines that a reception operation should be slept if many code errors are detected more than a preset condition. Then, the unit 208 outputs a signal instructing to sleep an operation to at least reception unit 200 operating in reception for a period of a frame length of the frame 300 read by the header analysis unit 206. According to this embodiment, each operation of the header analysis unit 206 and the code check unit 209 is slept in addition to the reception unit 200 composed of RF unit 202, A/D converter unit 203 and demodulation/decoding unit 204. The awake/sleep control unit 208 manages the frame length progress of the frame 300, and restarts all operation after the frame length elapsed.

Data length of the leading logical frame of the payload 303 is shortened or a logical frame including no execution data is provided. In this way, it is possible to determine continuation/sleep of the reception operation soon.

According to the second embodiment, it is possible to accurately determine that a probability of reception success of the received frame is low. Therefore, this serves to prevent reduction of transmission efficiency, and to reduce power consumption.

This second embodiment relates to a wireless communication system, which can receive and transmit the frame shown in FIGS. 3A to 3C. The second embodiment is applicable to a wireless communication system according other wireless communication standard.

Third Embodiment

Figure 5:
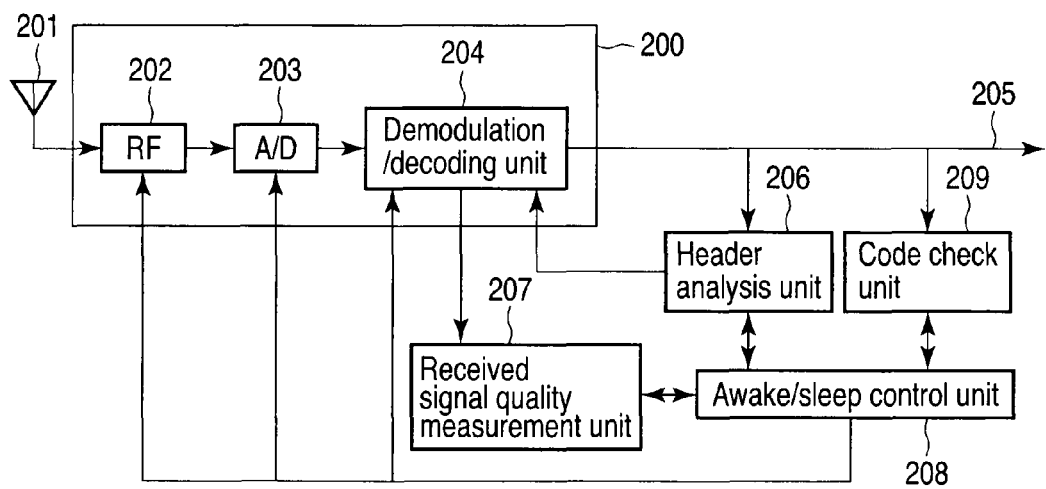
FIG. 5 is a block diagram showing the configuration of hardware of a wireless communication system according to a third embodiment of the present invention.

FIG. 5 shows the configuration of hardware, in particular, a physical layer of a wireless communication system according to a third embodiment. The wireless communication system of this embodiment has substantially the same configuration as that described in the second embodiment shown in FIG. 4. The communication system of the third embodiment differs from that of the second embodiment in the following point. Namely, the wireless communication system is provided with a received signal quality measurement unit 207 like the wireless communication system described in the first embodiment shown in FIG. 2. According to this embodiment, the same frame as the wireless communication system described in the second embodiment shown in FIG. 3A is received and transmitted.

In the wireless communication system of this embodiment, the received signal quality measurement unit 207 measures a quality of the leading portion of preamble 301, header 302 or payload 303 outputting by the demodulation/decoding unit 204. Thereafter, the unit 207 supplies the measured result to the awake/sleep control unit 208. In this case, received signal strength, transmission channel response estimation result and EVM are effective as the index of the received signal quality. A code check unit 209 checks an error detection code given for each logical frame, and then, supplies the detected code error to the awake/sleep control unit 208.

Figure 6:
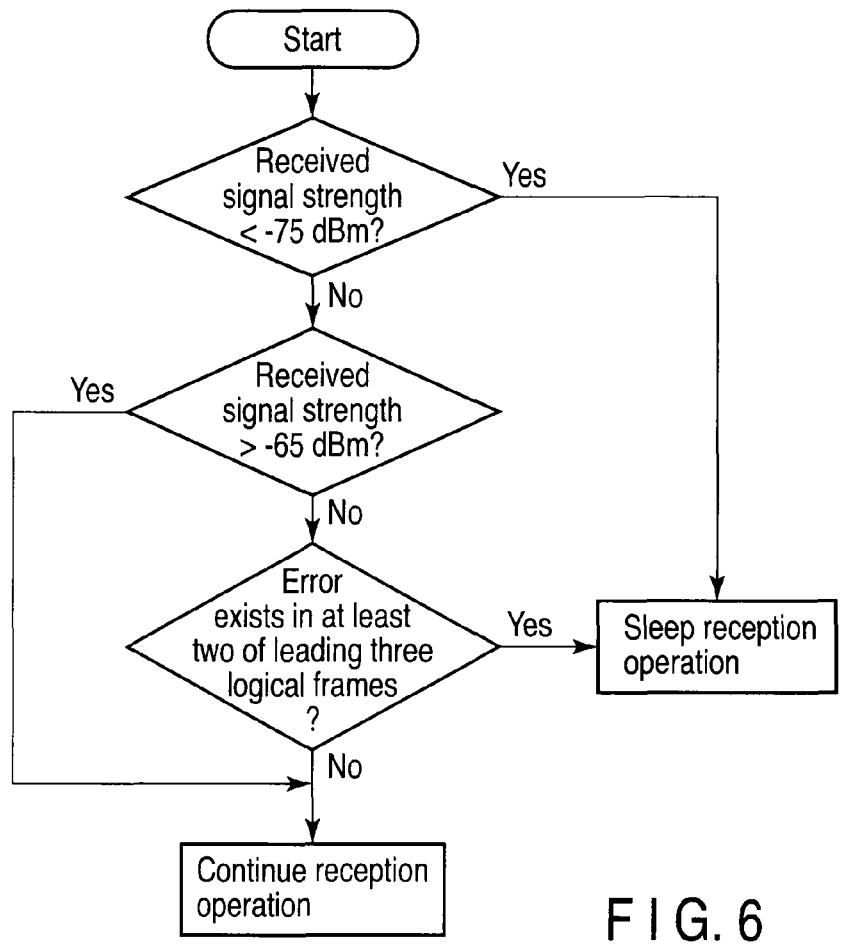
FIG. 6 is a flowchart to explain the operation of an awake/sleep control unit shown in FIG. 5.

FIG. 6 is a flowchart to explain the operation of the awake/sleep control unit 208. The unit 208 determines continuation/sleep of the reception operation based on the received signal quality and the code error detection result. In this case, the unit 208 previously holds a quality threshold for determining continuation/judgment reservation and judgment reservation/reception operation stop. The received signal strength is used as the received signal quality index. The threshold of the continuation/judgment reservation of the reception operation is determined as −65 dBm. The threshold of the judgment reservation/reception operation stop is determined as −75 dBm.

Further, a code error condition for determining the continuation/sleep of the reception operation is set as follows. Specifically, at least two of the leading three logical frames of the payload 303 have an error code. If the foregoing quality is determined as judgment reservation, the reception operation temporarily continues. Then, it is determined that the reception operation is slept if at least two of the leading three logical frames have an error code. Conversely, if the logical frame having an error code is less than one in the leading three logical frames, it is determined that the reception operation continues.

If it is determined that the reception operation is slept, a signal instructing to sleep an operation is output to at least reception unit 200 operating in reception for a period of the frame length read by the header analysis unit 206. According to this embodiment, each operation of the header analysis unit 206, the code error check unit 209 and the received signal quality measurement unit 207 is slept in addition to the reception unit 200 composed of RF unit 202, A/D converter unit 203 and demodulation/decoding unit 204. The awake/sleep control unit 208 manages the progress of the frame length, and then, restarts all operation after the frame length elapsed.

It should be noted that the foregoing operation is controlled by a built-in sequencer circuit, or controlled based on software by a built-in microprocessor.

According to the third embodiment, if a frame having low reception success probability is received, the reception operation is slept soon. Further, a judgment error of continuation/sleep of the reception operation is reduced compared with the first and second embodiments.

This embodiment relates to the wireless communication system, which can receive and transmit the frame shown in FIG. 3. The third embodiment is applicable to a wireless communication system conforming to other wireless communication standard.

Fourth Embodiment

Figure 7:
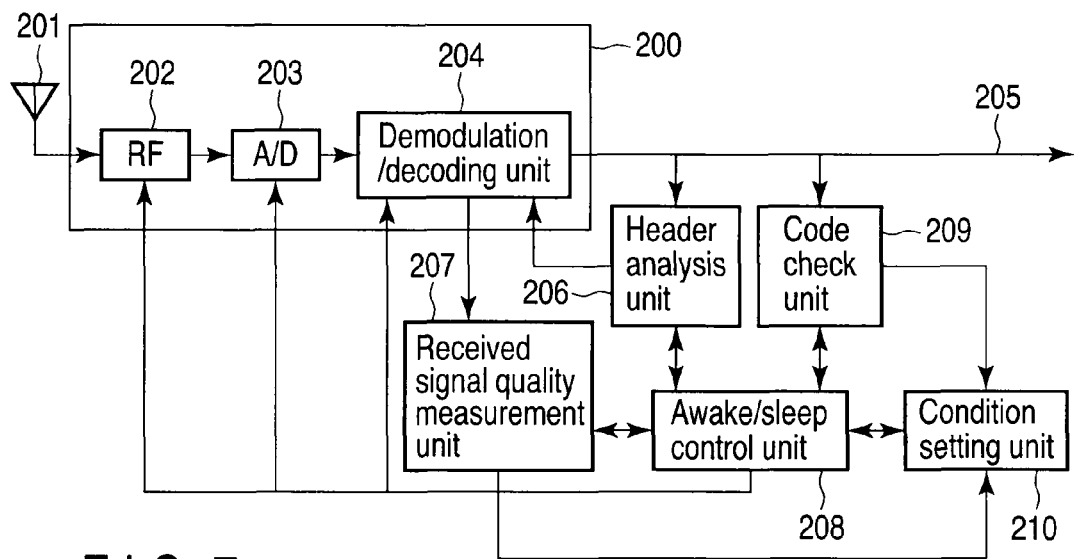
FIG. 7 is a block diagram showing the configuration of hardware of a wireless communication system according to a fourth embodiment of the present invention.

FIG. 7 shows the configuration of hardware, in particular, a physical layer of a wireless communication system according to a fourth embodiment. The wireless communication system of the fourth embodiment has substantially the same configuration as that of the third embodiment described in FIG. 5. The wireless communication system of the fourth embodiment differs from that of FIG. 5 in that a condition setting unit 210 is additionally provided. According to this embodiment, the same frame as the wireless communication system described in the second embodiment shown in FIG. 3.

A code check unit 207 checks an error detection code given for each logical frame, and then, supplies the detected error code to an awake/sleep control unit 208 and a condition setting unit 210.

In the wireless communication system of this embodiment, a received signal quality measurement unit 207 measures a quality of a signal of the leading portion of preamble 301, header 302 or payload 303 for a period until 1000 frames are received after the system starts. Thereafter, the unit 207 supplies the measured result to the condition setting unit 210. In this case, received signal strength, transmission channel response estimation result and EVM are effective as the index of the quality. Further, a code error detected by the code check unit 209 is supplied to the condition setting unit 210.

1000 frames are received after the system starts, and thereafter, the condition setting unit 210 sets a control condition of the awake/sleep control unit 208 based on received signal quality and data of any one of code errors. For example, the condition setting unit 210 extracts the maximum value X of x and the minimum value Y of y satisfying the following condition from the result receiving 1000 frames. According to the foregoing condition, received frames weaker than received signal strength x dBm all include a code error. Further, received frames stronger than received signal strength y dBm (x≠y) all do not include a code error.

The condition setting unit 210 uses the received signal strength as the index of the control condition of the awake/sleep control unit 208. In this way, the threshold of judgment reservation/reception operation stop is determined as X dBm, and the threshold of reception operation continuation/judgment reservation is determined as Y dBm. A code error condition for determining the reception operation continuation/reception operation stop is set as follows. According to the code error condition, all of the leading three logical frames of the payload 303 include an error.

According to the foregoing operation example, timing when the condition setting unit 210 sets the control condition is just after the wireless communication system starts. The timing may be optional time when the user of the wireless communication system or built-in software starts. Further, according to the foregoing operation example, the condition setting unit 210 sets the control condition based on the result receiving 1000 frames after the wireless communication system starts. The number of frames may be 1000 or more. In addition, timing may be set using time based on the result receiving one second after the wireless communication system starts.

If it is determined that the foregoing quality is judgment reservation, the reception operation temporarily continues. If all logical frames include an error code in the leading three logical frames of the payload 303, it is determined that the reception operation is slept.

Conversely, if frames including an error are less than two in the leading three logical frames of the payload 303, it is determined that the reception operation continues. If it is determined that the reception operation is slept, a signal instructing operation be stopped is output to at least reception unit 200 operating in reception for a period of the frame length read by the header analysis unit.

This embodiment relates to the wireless communication system, which can receive and transmit the frame shown in FIG. 3. The fourth embodiment is applicable to a wireless communication system conforming to other wireless communication standard.

Fifth Embodiment

According to the fifth embodiment of the present invention, an awake/sleep control unit 208 is configured so that a holding threshold for determining a received signal quality properly changes. The awake/sleep control unit 208 sets the threshold to a low value so that sleep control is carried out in the initial state. Then, the awake/sleep control unit 208 periodically changes the threshold based on a prepared data table in accordance with the measured result of the received signal quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication system comprising:
a reception unit configured to receive a signal;
a header analysis unit configured to receive the received signal to read a parameter showing a format of a digital signal contained in the received signal;
a received signal quality measurement unit configured to receive the received signal from the reception unit to measure a quality of the received signal from the reception unit; and
an awake/sleep control unit configured to connect to the reception unit, the header analysis unit and the received signal quality measurement unit, and configured to control awake and sleep of at least one of the reception unit, the header analysis unit and the received signal quality measurement unit, the awake/sleep control unit configured to control to sleep an operation of said at least one of the reception unit, the header analysis unit and the received signal quality measurement unit for a period corresponding to a frame length extracted from the parameter read by the header analysis unit when the quality measured by the received signal quality measurement unit is lower than a predetermined threshold.

2. The system according to claim 1, wherein the awake/sleep control unit executes control to sleep the operation of said at least one of the reception unit, the header analysis unit and the received signal quality measurement unit, and thereafter, executes control to restart said at least one of the reception unit, the header analysis unit and the received signal quality measurement unit when the period corresponding to a frame length ends.

3. The system according to claim 1, wherein the awake/sleep control unit controls restart and sleep of the header analysis unit and the received signal quality measurement unit in addition to the reception unit.

4. The system according to claim 1, wherein the reception unit includes:
a radio-frequency unit configured to convert a frequency band of a signal received by an antenna;
an analog-to-digital converter unit configured to convert an analog output of the radio-frequency unit to a digital signal; and
a demodulation/decoding unit configured to demodulate and decode an output of the analog-to-digital converter unit.

5. The system according to claim 1, wherein the received signal quality measurement unit measures a quality based on any of signal strength, transmission channel response estimation result and error vector magnitude of the reception signal.

6. The system according to claim 1, wherein the received signal quality measurement unit measures a quality of the leading portion of the received signal from the reception unit.

7. The system according to claim 1, wherein the threshold is a fixed value determined in accordance with a modulation method of the received signal from the reception unit and a coding rate.

8. The system according to claim 1, wherein the threshold changes based on a prepared data table.

9. A wireless communication system comprising:
a reception unit configured to receive a signal;
a header analysis unit configured to receive the received signal to read at least one of a frame length, a modulation method and a coding rate from the received signal;
a code check unit configured to receive the received signal from the reception unit to check an error detection code contained in the received signal from the reception unit for each frame, and configured to detect a code error; and
an awake/sleep control unit configured to connect to the reception unit, the header analysis unit and the code check unit, and configured to control restart and sleep of at least one of the reception unit, the header analysis unit and the code check unit, the awake/sleep control unit configured to control to sleep an operation of said at least one of the reception unit, the header analysis unit and the code check unit for a period corresponding to a frame length read by the header analysis unit when the number of code errors detected by the code check unit is more than a predetermined number.

10. The system according to claim 9, wherein the awake/sleep control unit executes control to sleep the operation of said at least one of the reception unit, the header analysis unit and the code check unit, and thereafter, executes control to restart said at least one of the reception unit, the header analysis unit and the code check unit when the period corresponding to a frame length ends.

11. The system according to claim 9, wherein the awake/sleep control unit controls restart and sleep of the header analysis unit and the code check unit in addition to the reception unit.

12. The system according to claim 9, wherein the reception unit includes:
a radio-frequency unit configured to convert a frequency band of a signal received by an antenna;
an analog-to-digital converter unit configured to convert an analog output of the radio-frequency unit to a digital signal; and
a demodulation/decoding unit configured to demodulate and decode an output of the analog-to-digital converter unit.

13. A wireless communication system comprising:
a reception unit configured to receive a signal;
a header analysis unit configured to receive the received signal to read at least one of a frame length, a modulation method and a coding rate from the received signal;
a received signal quality measurement unit configured to receive the received signal from the reception unit to measure a quality of the received signal from the reception unit;
a code check unit configured to receive the received signal from the reception unit to check an error detection code contained in the received signal from the reception unit for each frame, and configured to detect a code error; and
an awake/sleep control unit configured to connect to the reception unit, the header analysis unit and the received signal quality measurement unit, and configured to control restart and sleep of at least one of the reception unit, the header analysis unit, the received signal quality measurement unit and the code check unit, the awake/sleep control unit configured to control to sleep an operation of said at least one of the reception unit, the header analysis unit, the received signal quality measurement unit and the code check unit for a period corresponding to a frame length read by the header analysis unit based on the quality measured by the received signal quality measurement unit and the number of code errors detected by the code check unit.

14. The system according to claim 13, wherein the awake/sleep control unit executes control to sleep the operation of said at least one of the reception unit, the header analysis unit, the received signal quality measurement unit and the code check unit, and thereafter, executes control to restart said at least one of the reception unit, the header analysis unit, the received signal quality measurement unit and the code check unit when the period corresponding to a frame length ends.

15. The system according to claim 13, wherein the awake/sleep control unit executes control to sleep an operation of said at least one of the reception unit, the header analysis unit, the received signal quality measurement unit and the code check unit based on a received signal quality measured by the received signal quality measurement unit, and thereafter, executes control to sleep an operation of the reception unit based on the number of code errors detected by the code check unit.

16. The system according to claim 13, wherein the awake/sleep control unit controls restart and sleep of the header analysis unit, the received signal quality measurement unit and the code check unit in addition to the reception unit.

17. The system according to claim 13, wherein the reception unit includes:
   a radio-frequency unit configured to convert a frequency band of a signal received by an antenna;
   an analog-to-digital converter unit configured to convert an analog output of the radio-frequency unit to a digital signal; and
   a demodulation/decoding unit configured to demodulate and decode an output of the analog-to-digital converter unit.

18. The system according to claim 13, further comprising:
   a condition setting unit configured to connect to the received signal quality measurement unit, the code check unit and the awake/sleep control unit, and configured to set a condition when the awake/sleep control unit executes control to sleep an operation of the reception unit based on at least one data item of a received signal quality measured by the received signal quality measurement unit and the number of code errors detected by the code check unit.

19. The system according to claim 13, wherein the received signal quality measurement unit measures a quality based on any of signal strength, transmission channel response estimation result and error vector magnitude of the reception signal.

20. The system according to claim 13, wherein the received signal quality measurement unit measures a quality of the leading portion of the received signal from the reception unit.

* * * * *